United States Patent [19]

Johns et al.

[11] Patent Number: 4,621,252

[45] Date of Patent: Nov. 4, 1986

[54] SAFETY APPARATUS

[76] Inventors: David G. Johns, 29 Porter Street, Eltham, Victoria; Kieran J. Donlon, 44 Torrens Street, Werribee, Victoria; Manfred E. Braun, 27 Armstrong Street, West Sunshine, Victoria, all of Australia

[21] Appl. No.: 652,972

[22] Filed: Sep. 21, 1984

[30] Foreign Application Priority Data

Dec. 23, 1983 [AU] Australia ............................ 22921/83

[51] Int. Cl.$^4$ .......................... B60Q 1/00; G08G 1/16
[52] U.S. Cl. .................................. 340/61; 340/52 H; 340/903; 340/905; 180/271; 180/275
[58] Field of Search ............... 340/61, 52 H, 903–906, 340/983; 180/271, 274, 275

[56] References Cited

U.S. PATENT DOCUMENTS

| | | | |
|---|---|---|---|
| 3,419,847 | 12/1968 | Bonney | 340/61 |
| 3,689,882 | 9/1972 | Dessailly | 340/903 |
| 3,716,833 | 2/1973 | Roth | 340/61 |
| 3,824,469 | 7/1974 | Ristenbatt | 340/905 |
| 3,899,671 | 8/1975 | Stover | 340/905 |
| 3,978,447 | 8/1976 | Bankes . | |
| 4,307,375 | 12/1981 | Marshall, Sr. | 340/61 |

FOREIGN PATENT DOCUMENTS 465129  5/1937  United Kingdom ................ 340/903

*Primary Examiner*—Donnie L. Crosland
*Attorney, Agent, or Firm*—Murray and Whisenhunt

[57] ABSTRACT

For indicating whether a vehicle can pass through a bridge, a radio transmitter is positioned adjacent the bridge to generate radio signals which are encoded with information as to the height of the bridge as presented to vehicles. A vehicle is provided with a radio receiver capable of receiving and decoding the signals from the transmitter, and comparing the height information so derived with pre-encoded information as to the height of the vehicle. A warning signal is produced in the event that the comparison indicates a danger that the vehicle cannot safely pass under the bridge. The technique is also applicable to railway crossings where a transmitter is positioned at the crossing to generate ratio signals indicative of approach of a train so that the receiver on the vehicle may provide a warning of such approach of a train on decoding the radio signals.

21 Claims, 7 Drawing Figures

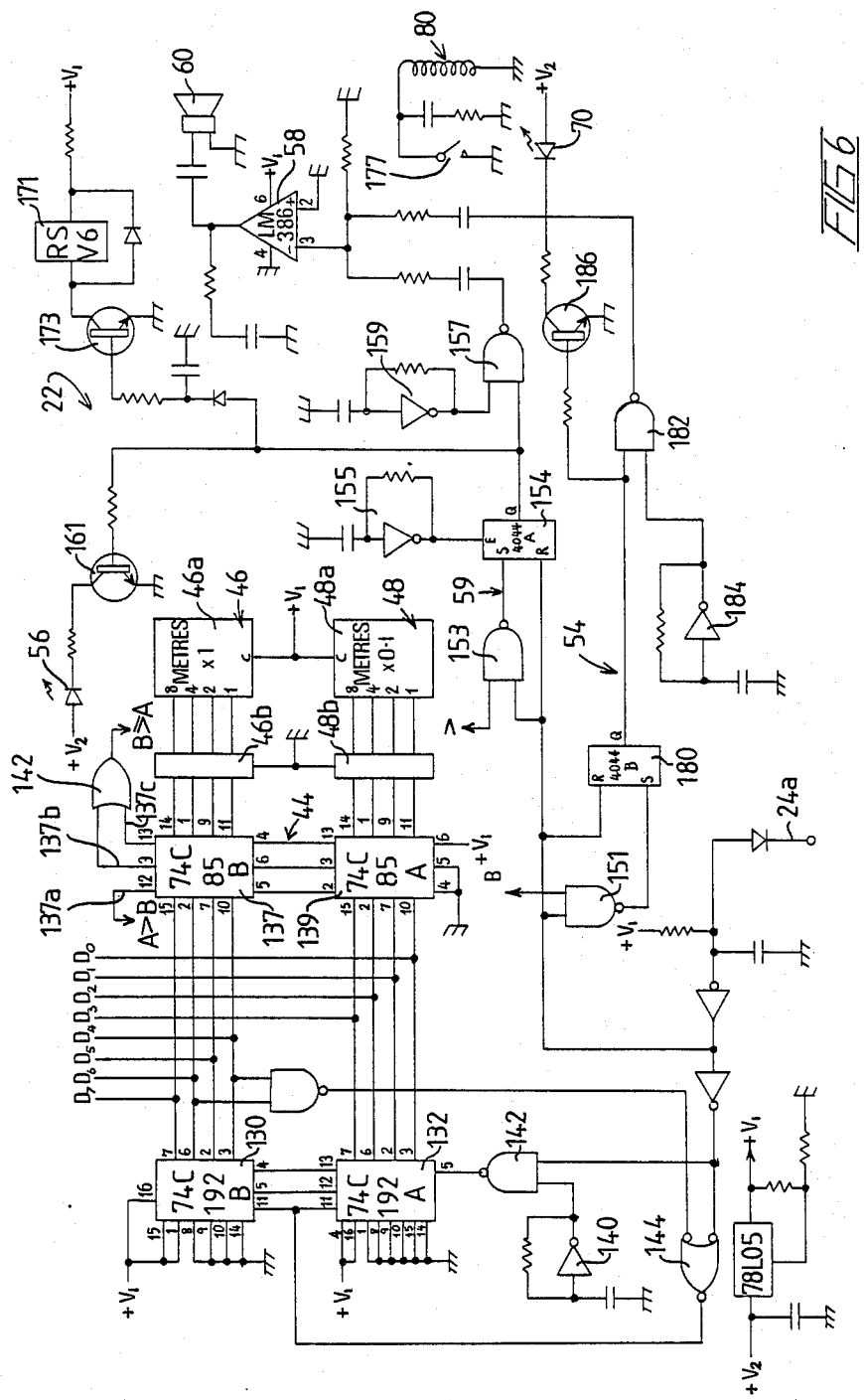

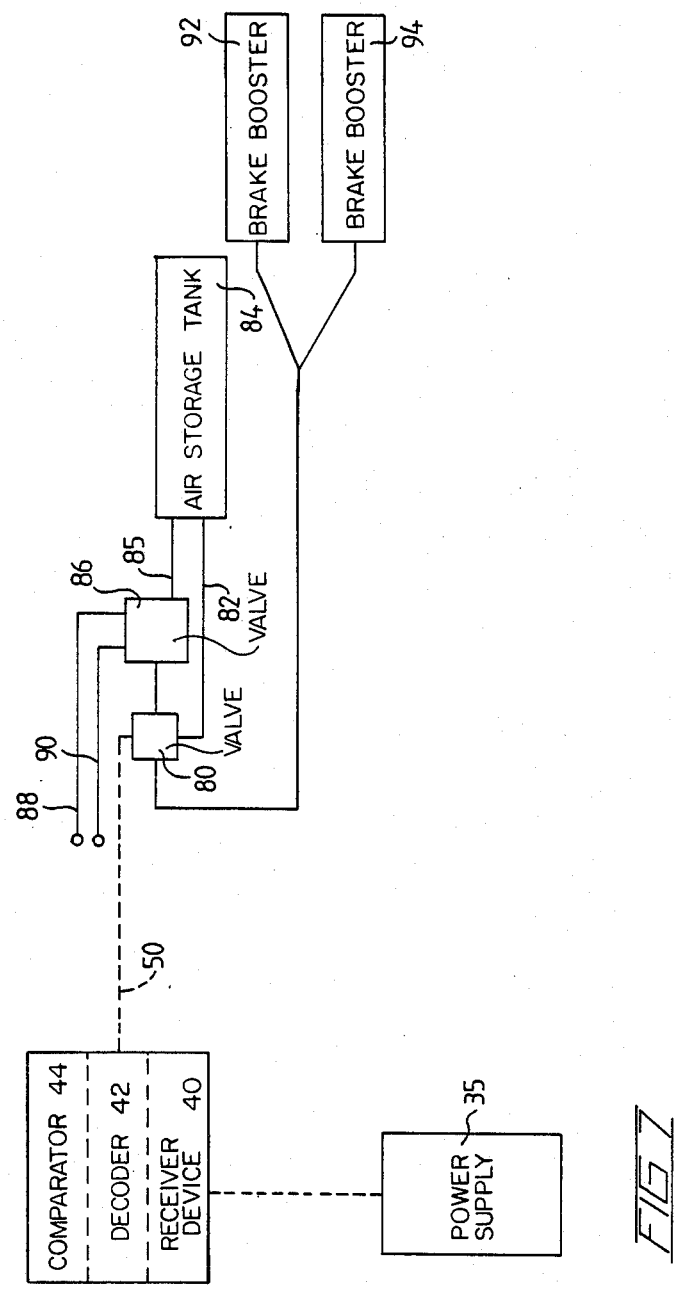

SAFETY APPARATUS

This invention relates to a method and apparatus for providing warnings to drivers of vehicles.

In one aspect, the invention provides a method for indication of conditions to be expected to be encountered by a vehicle at a location to which the vehicle may travel, comprising transmitting signal from the vicinity of the location, said signal containing information as to said conditions, detecting said signal with a detector on said vehicle as said vehicle approaches the location and causing an alarm to be raised and/or safety apparatus to be operated in the event that the signal is indicative of existence of a particular condition at said location.

The invention also provides a system for indicating conditions to be expected to be encountered by a vehicle at a location to which the vehicle may travel comprising a transmitter operable to transmit a signal in the vicinity of the location and therearound, said signal containing information as to said conditions, together with a receiver positioned on said vehicle and arranged for receipt of said signal as the vehicle approaches said location, said receiver being provided with means operable in response to said signal being indicative of existence of a particular condition at said location to cause an alarm device in said vehicle to be operated and/or cause safety apparatus in the vehicle to be operated.

The invention also provides a signal receiver fittable to a vehicle such as to enable it to receive encoded signals containing information as to conditions at a location on approach of a vehicle towards that location, said apparatus including decoding means for decoding said signal to provide said information, a store operable to store therein information as to at least one particular condition for which said signal may be indicative, comparator means coupled to said decode and to said store and operable to compare the said decoded information and said information in said store, and means responsive, on the result of said comparison being such that said signal is found to be indicative of said particular condition, to operate a warning device to provide an alarm signal and/or to operate safety apparatus to prevent said vehicle reaching said location.

The invention also provides a railway crossing characterized by the provision of transmitter means for transmitting a signal in at least one approach direction for receipt by transmitters in vehicles approaching the crossing, said signal having encoded therein information as to the state of operation of warning apparatus associated with the crossing or warning of approach of a train.

In another particular aspect of the present invention there is provided a method for indication whether a vehicle can pass through a bridge or other obstruction, comprising transmitting a signal from the vicinity of the obstruction, said signal containing information as to a maximum clearance dimension of the obstruction, detecting said signal with a detector on said vehicle as said vehicle approaches the obstruction, comparing the said information contained in the signal with prestored information as to the magnitude of a dimension of said vehicle corresponding to said clearance dimension and causing an alarm to be raised and or safety apparatus to be operated in the event that the comparison indicates that said dimension of said vehicle is not less than the clearance dimension of the obstruction.

The invention also provides a system for indicating whether a vehicle can safely pass through a bridge or other obstruction comprising a transmitter operable to transmit a signal in the vicinity of the obstruction and therearound at least in an expected approach direction of said vehicle to the obstruction, said signal containing information as to a clearance dimension of the obstruction, together with a receiver positioned on said vehicle and arranged for receipt of said signal as the vehicle approaches the obstruction from said approach direction, said receiver being provided with means for comparing the said information as contained in said signal with pre-stored information as to a vehicle dimension corresponding to the clearance dimension, an alarm device, and means coupled to said alarm device and to said comparator and operable to cause said alarm device to be operated when, on the basis of said signal information and stored information, said dimension of said vehicle is not less than the said clearance dimension.

In a further aspect, the invention provides a signal receiver fittable to a vehicle such as to enable it to receive radio or like signals containing encoded information as to a clearance dimension of an obstruction on approach of the vehicle towards the obstruction, said apparatus further including decoding means operable to decode the said signal to thereby provide said information, a store operable to store therein information as to a dimension of the vehicle corresponding to said clearance dimension, comparator means coupled to said store and to said decoder and operable to compare the said information in each of these, and means responsive, on result of said comparison being that said dimension of the vehicle is not less than the clearance dimension of the obstruction, to operate a warning device to provide an alarm signal.

Preferably, the method and system and receiver of the invention are so arranged that said alarm is caused to be raised in the event that said dimension of said vehicle is not sufficiently less than said clearance dimension to permit safe passage through the obstruction.

In a still further aspect, the invention provides a bridge or other obstruction adjacent a roadway and positioned such that vehicles using the roadway must pass therethrough, said obstruction having a clearance dimension which must be greater than a corresponding dimension of the vehicle for safe passage of the vehicle, characterised by the provision of transmitter means for transmitting a signal in at least one approach direction for vehicles approaching the obstruction, said signal having encoded therein the magnitude of said clearance dimension.

Normally, said clearance dimension is the height of an opening in said obstruction, but it may, for example, be the width of such opening.

In most cases, radio transmissions are used for carrying said information. However, other arrangements such as infra-red radiation devices may be employed.

The method system and receiver of the invention may be arranged for automatic operation of brakes of said vehicle where said dimension of said vehicle is detected as being not less than said clearance dimension.

The invention is further described with reference to the accompanying drawings in which:

FIG. 6 is a more detailed circuit diagram of logic circuitry associated with the receiver of FIG. 3; and FIG. 7 is a diagram illustrating the manner of interconnection of the receiver of FIG. 2 for automatic operation of vehicle brakes.

Figure 1:
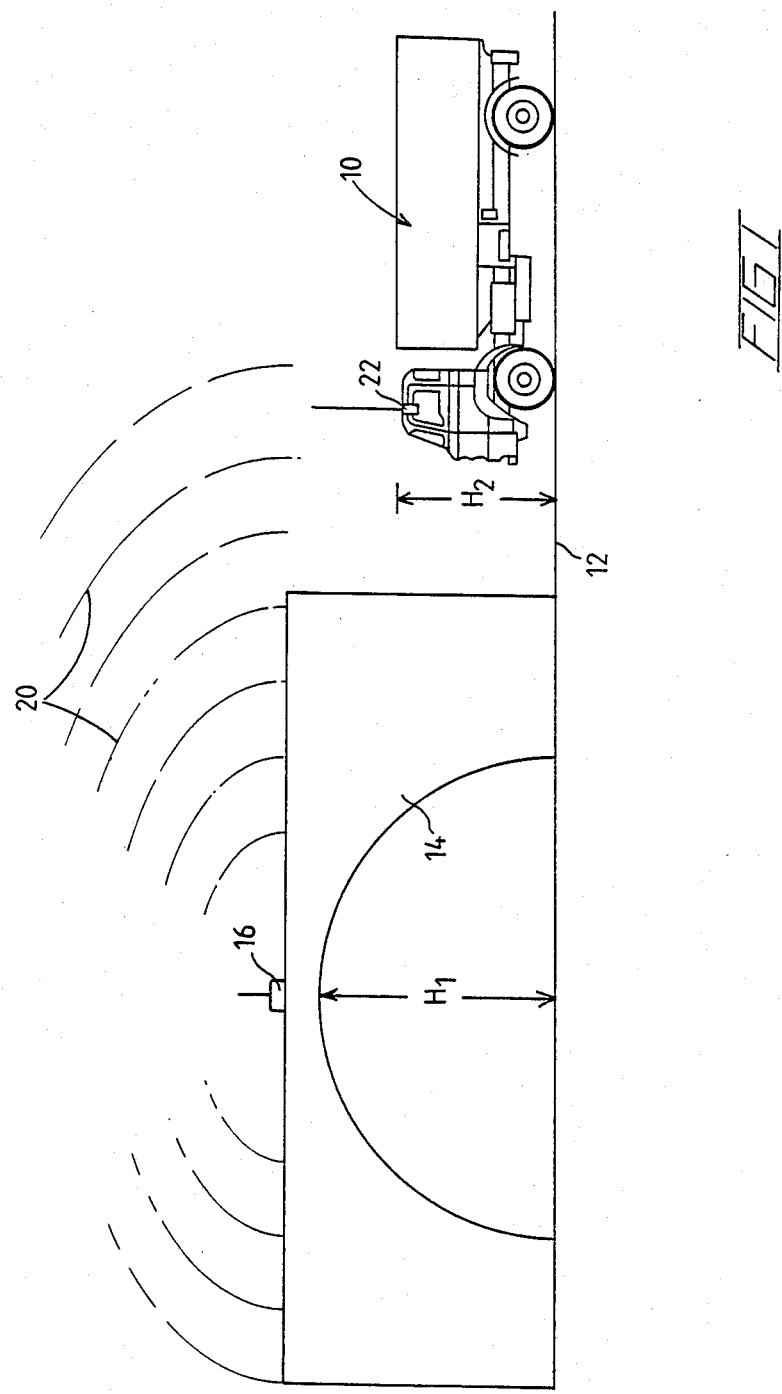
FIG. 1 is a diagram illustrating the manner of operation of the invention.

In FIG. 1, a vehicle 10 is shown travelling on a road 12 towards a bridge 14. The bridge has a clearance height (i.e. height representing the maximum height of a vehicle which can pass therethrough) of $H_1$. The vehicle has a total height $H_2$. Obviously, if $H_1$ is greater than $H_2$ the vehicle can safely pass through the bridge 14 but if not the vehicle cannot so pass.

A radio transmitter 16 is positioned in the vicinity of bridge 14 and is arranged to continuously radiate radio signals (diagrammatically represented at 20) therearound. The vehicle 10 is fitted with a receiver 22 operable to detect the radio signals 20.

The transmitter 16 is arranged to transmit the radio signal 20 in a form such that the signal contains coded information as to the magnitude of the height $H_1$. This information is repetitively transmitted. Receiver 22 is arranged to permit decoding of the signal 20 to retrieve the aforementioned information as to the magnitude of height $H_1$ and to compare that information with pre-stored information as to the height $H_2$ and provide a warning indication if it appears, on the basis of that comparison, that the vehicle cannot pass under the bridge.

Figure 2:
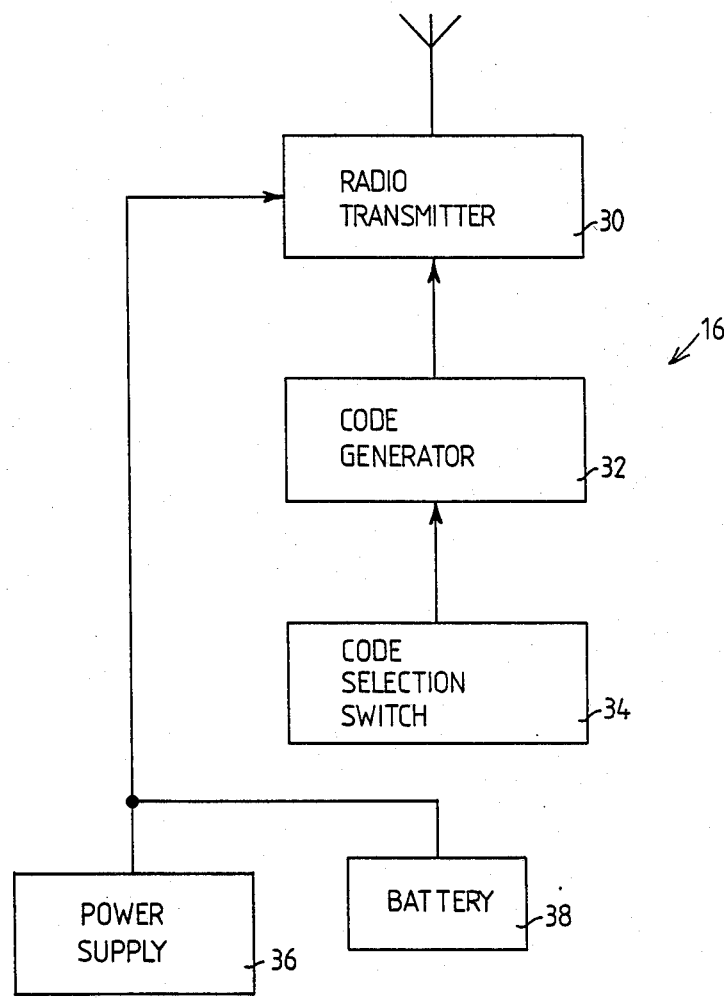
FIG. 2 is a block diagram of a radio transmitter useful in the invention.

Turning now to FIG. 2, the transmitter 16 is shown in more detail. More particularly, it comprises a conventional transmitter device 30 providing a continuous transmitted signal on a frequency of, say 27 MHz to 40 MHz. A presettable code generator 32 is provided connected to the transmitter device 30 in a fashion such that it modulates the output of the radio transmitter device 30 in a fashion such that the transmitted signal contains coded information as to the height $H_1$ as aforedescribed. The modulation may be effected using pulse width techniques arranged to repetitively transmit a 12 bit code word representing the information as to height $H_1$. The information as transmitted may be varied by altering the 12 bit code by means of a code selection switch 34. Transmitter device and associated components may be operated from a mains supply indicated generally at 36 or by a battery 38.

Figure 3:
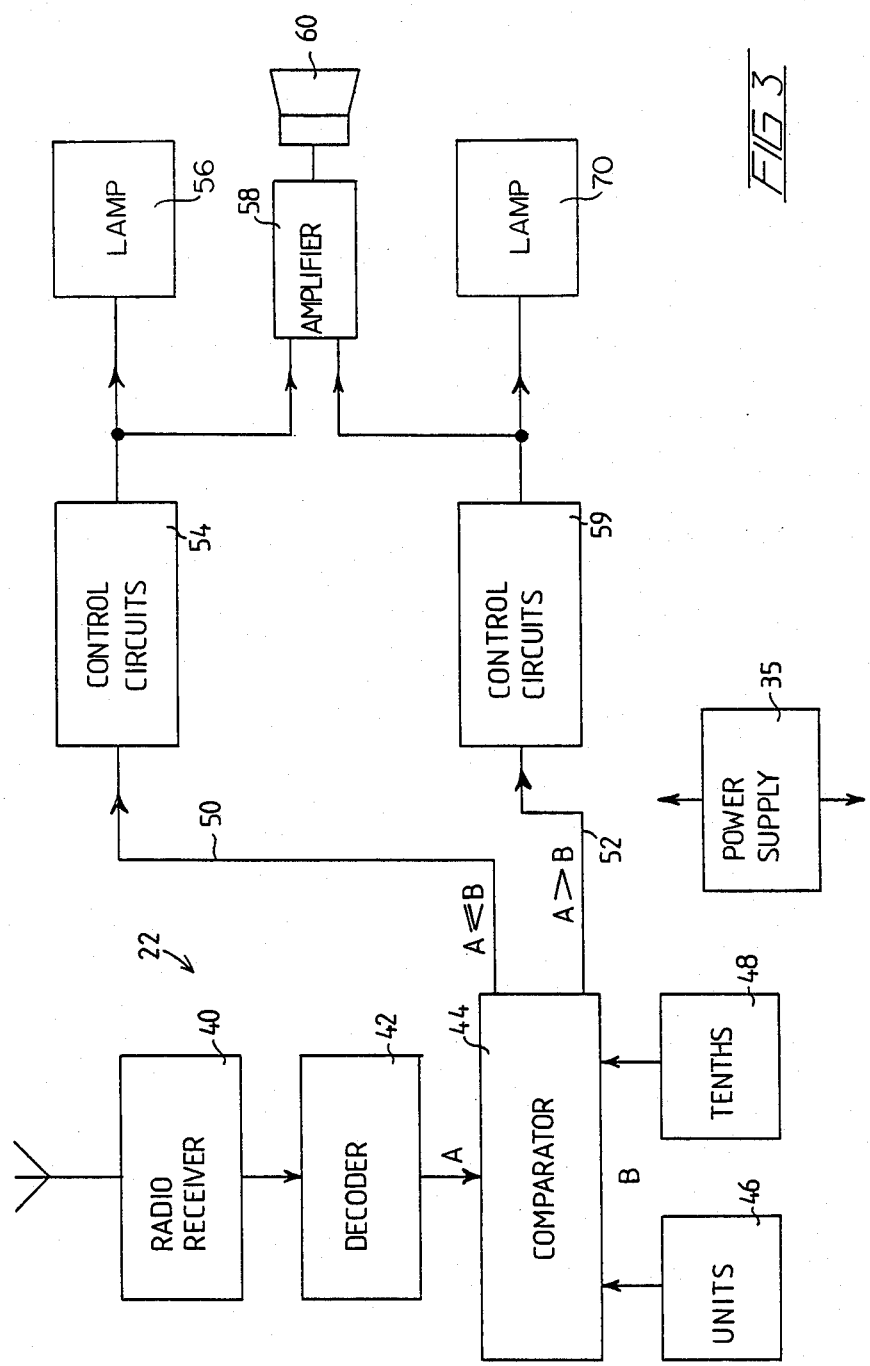
FIG. 3 is a block diagram of a radio receiver useful in the invention.

FIG. 3 shows in more detail the receiver 22, which is for example operable from the vehicle battery 35. Receiver 22 includes, a conventional radio receiver device 40 connected to a decoder 42. The receiver device 40 receives the signals from transmitter device 30 whilst the decoder 42 decodes the transmitted code word indicating height $H_1$. The magnitude of height $H_1$ is presented at the output of the decoder 42 as input "A" of a comparator 44. A second input "B" of comparator 44 is arranged to be conditionable to represent the magnitude of the vehicle height $H_2$. This may be effected by use of two thumb wheel switches 46, 48 connected to input "B" and presettable by the vehicle driver to represent, on the one hand, height units (such as meters) and, say, 10ths of height units (such as 10ths of meters). In any event, the magnitudes presented at inputs "A" and "B" may be presented in digitally encoded form. Comparator 44 is arranged to selectively enable either of two output lines 50, 52 therefrom. Line 52 is enabled in the event that the input "A" to the comparator is greater than the input "B" thereto, that is to say, in the event that the comparison of inputs indicated that the vehicle height $H_2$ is less than the height $H_1$ of the bridge. Output line 50 is, on the other hand, enabled if input "A" is equal to or less than the input "B", that is to say, in the event that the vehicle height $H_2$ is equal to or greater than height $H_1$. Line 50 is connected to a control circuit 54 which is in turn connected to a warning light 56 and to an amplifier 58 which latter is in turn connected to a loud-speaker 60. On enabling of line 50, circuit 54 operates to actuate a lamp 56 to provide a visual danger signal and amplifier 58 is actuated to cause loudspeaker 60 to be operated to emit a loud audible warning signal.

In the event that line 52 is enabled, a further control circuit 59 operates to condition amplifier 58 to cause a different type of sound to be emitted from loudspeaker 60 to that emitted when amplifier 58 is operated from circuit 54. For example, a relatively soft sound may be emitted. Further, a green light 70 is connected to circuit 59 in such a fashion that, on enabling of line 52, circuit 59 causes lamp 70 to be operated to confirm that a safety condition prevails.

Generally speaking, it is found that it is sufficient for transmitter 16 to have a range of, say, a few hundred meters. This may be achieved by arranging the transmitter device to feed a simple antenna. For example, if the transmitter is housed in a non-metallic box and is located in the open, a ferrite loop stick antenna may be sufficient, or alternatively a short whip antenna may be provided. The receiver for the vehicle may be likewise fitted with a relatively simple antenna which may be quite short in view of the relatively restricted range necessary for reception.

The described arrangement has been advanced merely by way of explanation and many modifications may be made thereto. For example the arrangement for the warning lights and loudspeaker may be varied, such as by causing lamps 56, 70 to be flashed on and off when actuated.

Generally, the lamps 56, 70 are positioned in a suitable location in the cabin of vehicle 10, such as on the dashboard although other locations may be employed. Normally, the loudspeaker is positioned in the vehicle cabin at any location where sound therefrom can be easily heard. Transmitter device 30 is preferably a standard crystal controlled phase modulated transmitter but other types may be used.

As shown in FIG. 7, the invention may be adapted for automatic actuation of the vehicle brakes in the event that the height $H_1$ should be equal to or less than the height $H_2$. In this case, the receiver 40, decoder 42 and comparator 44 are shown collectively, with the output line 50 which is enabled in the event of detection of an unsafe condition where the height $H_2$ of the vehicle is equal to or greater than the height $H_1$. This line 50 is connected to a solenoid valve 80 which is connected via a line 82 to the usual pressurized air storage tank 84 of the vehicle. The line 82 is separate from a line 85 connecting the tank 84 to the usual valve 86 which is actuated under control of differential air pressure in air supply and brake lines 88, 90 to effect normal operation of the brakes of the vehicle via the brake boosters 92, 94. Under normal operation, the valve 80 permits fluid flow connection from the tank 84 via the valve 86 to the boosters 92, 94. However when line 50 is enabled the solenoid valve 80 is operated so as to connect the tank 84 via the valve 80 to the boosters 92, 94 to operate these. Thus, on detection of an unsafe condition for transmit of the vehicle through bridge 14, the brakes are operated by operation of the brake boosters 92, 94.

Figure 4:
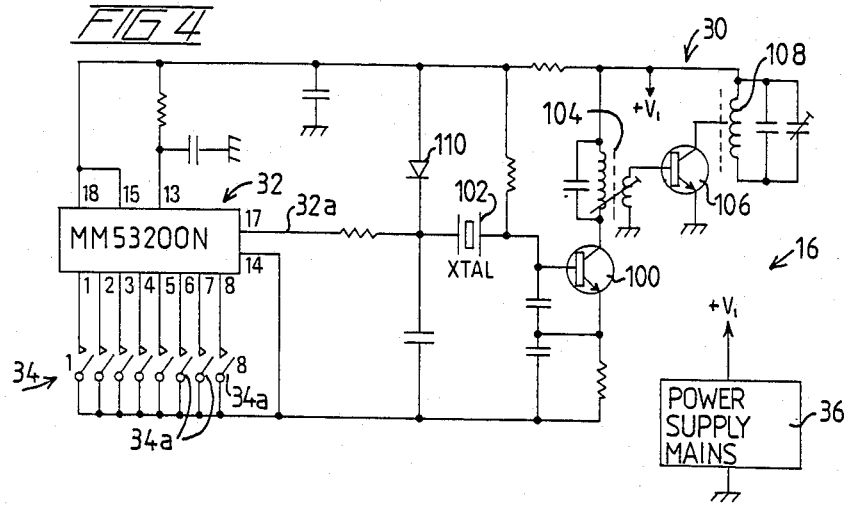
FIG. 4 is a more detailed circuit diagram of the transmitter of FIG. 2.

The circuit diagram of FIG. 4 shows circuit components of the transmitter 16. More particularly, the transmitter includes a crystal controlled oscillator including a transistor 100, a crystal 102 and a tuned circuit 104. The oscillator 100 operates at the desired operating frequency of the transmitter, supplying, from the tuned circuit 104, a transistor amplifier 106 which operates a ferrite rod aerial 108. The circuit for the oscillator includes a varactor doide 110 which is in a form of a voltage sensitive capacitor and the output from the oscillator is pulse width modulated by signal from an encoding device 32 which is coupled to the varactor 110. Device 32, is connected to a plurality of switches 34a which make up the code selection switch. These are adapted to condition inputs to the device 32 so that the device produces on an output line 32a therefrom a series of binary coded pulses which represent a signal encoding the desired magnitude of the height $H_1$. These pulses are applied to the varactor 110 in such a fashion as to cause its capacitance to vary in accordance with the coding thereof whereby to effect the aforedescribed modulation of the oscillator output and thus of the radio frequency output of the transmitter. The encoded binary signal is repetitively generated by device 32 and corresponding encoded radio frequency signal produced by the transmitter is likewise similarly repetitively generated.

Figure 5:
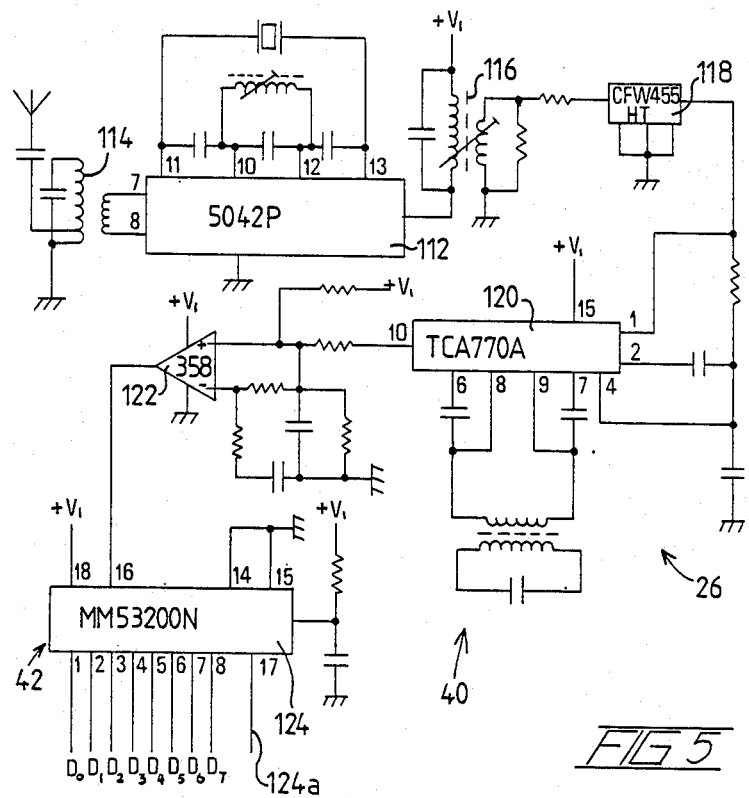
FIG. 5 is a more detailed circuit diagram of the receiver of FIG. 3.

FIG. 5 shows the circuit of part of the receiver 22, comprising the radio receiver device 40 and the decoder 42. The receiver device 40 is a conventional superhetrodyne receiver having a frequency converter 112 which receives signal from the receiving antenna 114. The resultant intermediate frequency signal is passed via a tuned circuit 116 and a ceramic filter device 118 to a demodulator 120 which serves to demodulate the received signal to recover a signal corresponding to the coded signal as encoded by device 32. This decoded signal, which comprises a set of sequential binary coded pulses which generally represent the encoding provided by device 32, is then passed to a comparator device 122 which serves to make the pulses of configuration suitable for application to the decoder 42. Decoder 42 comprises in this instance a decoding device 124 having a number of inputs $D_0 \ldots D_7$ corresponding to the number of switches 34a. These inputs are sequentially cycled over binary switch states, the set of such states representing different possible coded signals from the device 32. An output 124a from device 124 is conditioned to a unique condition on the coding on the inputs $D_0$ to $D_7$ coinciding with the coded signal being serially applied to the device 124 from device 122.

Referring now to FIG. 6, certain logic components of the receiver 22 are shown in more detail. More particularly, the inputs $D_0 \ldots D_7$ to the device 124 are shown as being connected to counters 130, 132. These counters count pulses produced by an oscillator 140, the output from the oscillator 140 being applied to the counters via a gate 142. The aforementioned cycling of the inputs $D_0$ to $D_7$ of device 124 is effected by repetitive upward counting of outputs from the counters 130, 132 to a predetermined end state. In the event of coincidence between the signal applied from device 122 and that applied on inputs $D_0$ to $D_7$, and subsequent conditioning of the output 124a to indicate this coincidence, the outputs of the counters 130, 132 are latched by virtue of connection of that output to gate 142 and a further gate 144. The latched outputs are then applied to magnitude comparators 137, 139, these comprising the comparator 44. Comparators 137, 139 have further inputs conditioned in accordance with a preset coding applied via the thumb wheel switches 46a, 48a and resistor networks 46b, 48b which comprise the units and tenths of units switches 46, 48 previously described. The latter inputs are thus coded to represent the desired height $H_2$ of the vehicle, that is to say the magnitude "B". The output from the counters 132, as latched, comprises the aforementioned magnitude "A". Magnitude comparator 137 produces, on one output 137a a signal indicative of the condition where "A" is greater than "B", that is to say where height $H_1$ is greater than height $H_2$, on an output 137b therefrom a signal indicative of the condition where magnitude "A" equals magnitude "B", that is where height $H_1$ equals height $H_2$ and on an output 137c an output indicative of the condition where magnitude "B" is greater than magnitude "A", that is to say when height $H_2$ is greater than height $H_1$. Output 137a is connected to a gate 151 enabled under the condition aforementioned where height $H_1$ is greater than height $H_2$. Outputs 137b, 137c are connected to a gate 142 which produces at its output an output indicative of the condition magnitude "B" is equal to or greater than magnitude "A", that is to say the condition where height $H_2$ is equal to or greater than height $H_1$. Output from gate 142 is connected to a further gate 159, the output of which is enabled under the last mentioned condition where height $H_2$ is equal to or greater than height $H_1$. Enabling of gate 153 is thus indicative of an alarm condition and enabling of gate 151 is indicative of a safe condition.

Output from gate 153 is connected to a latch 154 the output of which is latched to an on condition pursuant to the aforementioned conditioning of the output of gate 153 to indicate an alarm condition. This conditioning of the output of latch 154 permits a signal from an oscillator 155 to pass through the latch. Oscillator 155 is of low frequency having, for example one second on and one second off periods. This output, passes through the latch 154 to gate to the output of a gate 157, a corresponding higher frequency burst of signal from a second higher frequency oscillator 159, oscillator 159 being an audio frequency oscillator. The tone bursts so passing from gate 159 are fed to the aforementioned amplifier 58 thence to operate the loudspeaker 60 to give the required alarm signal. Also, the low frequency output from oscillator 155 passes from latch 154 to a transistor amplifier 161, thence to cause the aforementioned lamps 56 to flash. In this instance the lamp 56 is constituted by a light emitting diode.

Also shown in FIG. 6 is a relay device 171 which is connected via a transistor amplifier 173 to the output from latch 154 and which is latched in an on condition on first occurrence of signal at the output of latch 154 from oscillator 155. Relay device 171 is arranged to operate relay contacts 177, thence to operate the solenoid valve 80 shown in FIG. 7 to effect operation of the vehicle brakes.

The output from gate 151 is connected to a latch 180 which is latched in an on condition pursuant to the output from the gate 151 being conditioned to indicate the condition where height $H_1$ is greater than height $H_2$. Under this "safe" condition, the latch 180 is arranged to enable a gate 182 which then provides connection from an audio oscillator 184 to the amplifier 158 for operating the loud speaker 60. Oscillator 184 is arranged to operate a different frequency to oscillator 155 so as to provide a distinctive tone which is distinguishable from the tone produced under the aforementioned alarm condition be being, for example, at a higher pitch, and also being distinguishable by virtue of it being continuous rather than periodic as in the case of the tone produced in the alarm condition. Latch 180 also enables transistor amplifier 186 which operates a light emitting diode comprising the lamp 70. As described, the lamp 70 and 56 may be of different colour so as to enable ready distinguishing of the safe and unsafe conditions.

So the invention is also adaptable to purposes otherwise than for indicating vehicle clearances as above-described.

For example, the invention is applicable to providing warnings at intersections such as at railway intersections or crossings. For example where a road crosses a railway line, a detector could be positioned adjacent that crossing for detecting a condition where approach of a train on the railway line was detected. This could be simply effected by detecting a condition of operation of warning signals associated with the crossing such as the customary flashing red lights which are operated on approach of a train. This detection could be used to condition the output of a transmitter such as the transmitter device 16 positioned adjacent the crossing. The output signal condition from the transmitter 16 would then be conditionable to either of two states, one being indicative of the condition of operation of the crossing lights and one being indicative of the condition of non operation thereof. In the former case, a vehicle equipped with a receiver such as the receiver 22 described would receive the transmitted signal and operate to decode that signal and operate lights or other warning devices in the event that the signal being transmitted was indicative of operation of the crossing lights. This system could be readily adapted from the system previously described simply by organising the transmitter 16 to transmit only one of two different types of signal in accordance with the state of operation of the crossing lights and arranging the comparator 44 to operate the control circuits 54, 59 in accordance with whether or not a comparison of the decoded received signal with a pre-stored signal indicative of operation of the crossing lights so indicated that the crossing lights were operating. In the event that the lights were operating, the circuit 54 could be actuated to operate warning light 56 otherwise, circuit 59 would be actuated to operate lamps 70.

The described arrangements have been advanced merely by way of explanation and many modifications and variations may be made thereto without departing from the spirit and scope of the invention as defined in the appended claims.

We claim:

1. A method for indication whether a vehicle can pass under an obstruction, comprising transmitting a signal from the vicinity of the obstruction, said signal containing encoded information as to the clearance height of the obstruction, detecting said signal with a detector on said vehicle as said vehicle approaches the obstruction, comparing the said information contained in the signal with prestored information as to the height of said vehicle and causing indicator means of the vehicle to be actuated to provide a warning indication to a driver of the vehicle in the event that the comparison indicates that said height of said vehicle is not less than the clearance height of the obstruction and causing said indicator means to be actuated to provide an indication different to said warning indication in the event that the comparison indicates that the height of said vehicle is less than the clearance height of the obstruction.

2. A method or receiver as claimed in claim 1 wherein said signal is a radio signal.

3. A system for indication whether a vehicle can safely pass under an obstruction, comprising a transmitter operable to transmit a signal in the vicinity of the bridge and therearound at least in an expected approach direction of said vehicle to the obstruction, said signal containing encoded information as to a clearance height of the obstruction, together with a receiver positioned on said vehicle and arranged for receipt of said signal as the vehicle approaches the obstruction from said approach direction, said receiver being provided with a comparator for comparing the said information as contained in said signal with prestored information as to vehicle height, said comparator having first and second outputs which are respectively separately and singly enabled in accordance with whether, on the basis of said comparison the height of the vehicle is less than a safe value not more than said clearance height, or is not less than said safe value respectively, safety apparatus on said vehicle, and control means on said vehicle coupled to said safety apparatus and to said comparator and operable to cause said safety apparatus to be operated when, on the basis of said comparing by said comparator, the first output thereof is enabled, to provide: a first indication from the safety apparatus to a driver of said vehicle that passage under the obstruction can safety be effected, said control means also being effective to cause said safety apparatus to provide a second indication, different to said first indication, to a driver of said vehicle that passage under the obstruction cannot safely be effected, when on the basis of said comparing by said comparator, the second output thereof is enabled.

4. A system as claimed in claim 3, wherein said safety apparatus includes means coupled to said control means for operating the vehicles brakes when said second output is enabled.

5. A system as claimed in claim 4 wherein said safety apparatus comprises two light emitting devices, one being illuminated when said first output of said comparator is enabled, and the other being illuminated when the second output of the comparator is illuminated.

6. A system as claimed in claim 3 wherein said safety apparatus comprises two light emitting devices, one being illuminated when said first output of said comparator is enabled, and the other being illuminated when the second output of the comparator is illuminated.

7. A system as claimed in claim 3 wherein said transmitter and receiver comprise a radio transmitter and receiver respectively.

8. A system as claimed in claim 7 wherein said safety apparatus comprises two light emitting devices, one being illuminated when said first output of said comparator is enabled, and the other being illuminated when the second output of the comparator is illuminated.

9. A system as claimed in claim 4 wherein said transmitter and receiver comprise a radio transmitter and receiver respectively.

10. A system as claimed in claim 5 wherein said transmitter and receiver comprise a radio transmitter and receiver respectively.

11. A system as claimed in claim 6 wherein said transmitter and receiver comprise a radio transmitter and receiver respectively.

12. A signal receiver fittable to a vehicle such as to enable it to receive signals containing encoded information as to the clearance height of an obstruction on approach of the vehicle towards the obstruction, said receiver further including decoding means operable to decode the said signal to thereby provide said information, a store operable to store therein information as to the height of the vehicle, comparator means coupled to said store and to said decoder and operable to compare the said information in each of these, said comparators having first and second outputs which are respectively separately and singly enabled in accordance with whether, on the basis of said comparison the height of the vehicle is less than a safe value not more than said clearance height, or is not less than said safe value respectively means responsive, on enabling of said first output of said comparator to operate safety apparatus to indicate that safe passage under the obstruction is possible, and on enabling of said responsive on second output of said comparator to operate said safety appartus to indicate that safe passage under the obstruction is not possible.

13. A signal receiver as claimed in claim 12 wherein said receiver is a radio receiver.

14. A signal receiver as claimed in claim 12 wherein said safety apparatus comprises two light emitting devices, one being illuminated when said first output of said comparator is enabled, and the other being illuminated when the second output of the comparator is illuminated.

15. A signal receiver as claimed in claim 13 wherein said safety apparatus comprises two light emitting devices, one being illuminated when said first output of said comparator is enabled, and the other being illuminated when the second output of the comparator is illuminated.

16. A vehicle fitted with a radio receiver for receiving signals containing encoded information as to the clearance height of an obstruction on approach of the vehicle towards the obstruction, said receiver further including decoding means operable to decode the said signal to thereby provide said information, store operable to store therein information as to the height of the vehicle, comparator means coupled to said store and to said decoder and operable to compare the said information in each of these, means responsive, on enabling of said first output of said comparator to operate safety apparatus to indicate that safe passage under the obstruction is possible, and on enabling of said responsive second output of said comparator to operate said safety apparatus to indicate that safe passage under the obstruction the second output of said comparator to operate said safety apparatus to indicate that safe passage under the obstruction is not possible.

17. A vehicle as claimed in claim 16 wherein said receiver is a radio receiver.

18. A vehicle as claimed in claim 16 wherein said safety apparatus includes means coupled to said control means for operating the vehicles brakes when said second output is enabled.

19. A vehicle as claimed in claim 17 wherein said safety apparatus includes means coupled to said control means for operating the vehicles brakes when said second output is enabled.

20. A vehicle as claimed in claim 16 wherein said safety apparatus comprises two light emitting devices, one being illuminated when said first output of said comparator is enabled, and the other being illuminated when the second output of the comparator is illuminated.

21. A vehicle as claimed in claim 17 wherein said safety apparatus comprises two light emitting devices, one being illuminated when said first output of said comparator is enabled, and the other being illuminated when the second output of the comparator is illuminated.

* * * * *